(12) United States Patent
Heinrich et al.

(10) Patent No.: US 11,535,184 B2
(45) Date of Patent: Dec. 27, 2022

(54) METHOD FOR OPERATING AN OCCUPANT PROTECTION DEVICE

(71) Applicant: DAIMLER AG, Stuttgart (DE)

(72) Inventors: Till Heinrich, Stuttgart (DE); Jochen Feese, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 185 days.

(21) Appl. No.: 16/956,000

(22) PCT Filed: Dec. 12, 2018

(86) PCT No.: PCT/EP2018/084545
§ 371 (c)(1),
(2) Date: Jun. 19, 2020

(87) PCT Pub. No.: WO2019/121231
PCT Pub. Date: Jun. 27, 2019

(65) Prior Publication Data
US 2021/0086714 A1  Mar. 25, 2021

(30) Foreign Application Priority Data
Dec. 21, 2017 (DE) ............... 10 2017 011 827.2

(51) Int. Cl.
*B60R 21/0134* (2006.01)
*B60R 21/015* (2006.01)
(Continued)

(52) U.S. Cl.
CPC ...... *B60R 21/0134* (2013.01); *B60R 21/0136* (2013.01); *B60R 21/01512* (2014.10);
(Continued)

(58) Field of Classification Search
CPC ............................................. B60R 21/01512
See application file for complete search history.

(56) References Cited

U.S. PATENT DOCUMENTS 7,609,893 B2 * 10/2009 Luo ................. G06V 20/59
345/422
10,232,814 B2 * 3/2019 Gandhi .............. B60R 21/0134
(Continued)

FOREIGN PATENT DOCUMENTS

DE   102009001209 A1   9/2010
DE   102012024847 A1   6/2014
(Continued)

OTHER PUBLICATIONS

International Search Report dated Apr. 12, 2019 in related/corresponding International Application No. PCT/EP2018/084545.
(Continued)

*Primary Examiner* — Nicole T Verley
(74) *Attorney, Agent, or Firm* — Patent Portfolio Builders PLLC

(57) ABSTRACT

A method for operating an occupant protection device of a vehicle involves triggering an occupant protection mechanism, in the event of an imminent detected collision for the vehicle or of a detected collision of the vehicle. The triggering also depends upon detected image data of at least one interior camera of the vehicle and the triggering can be suppressed based on the detected image data of the interior camera.

16 Claims, 1 Drawing Sheet

Figure 1:
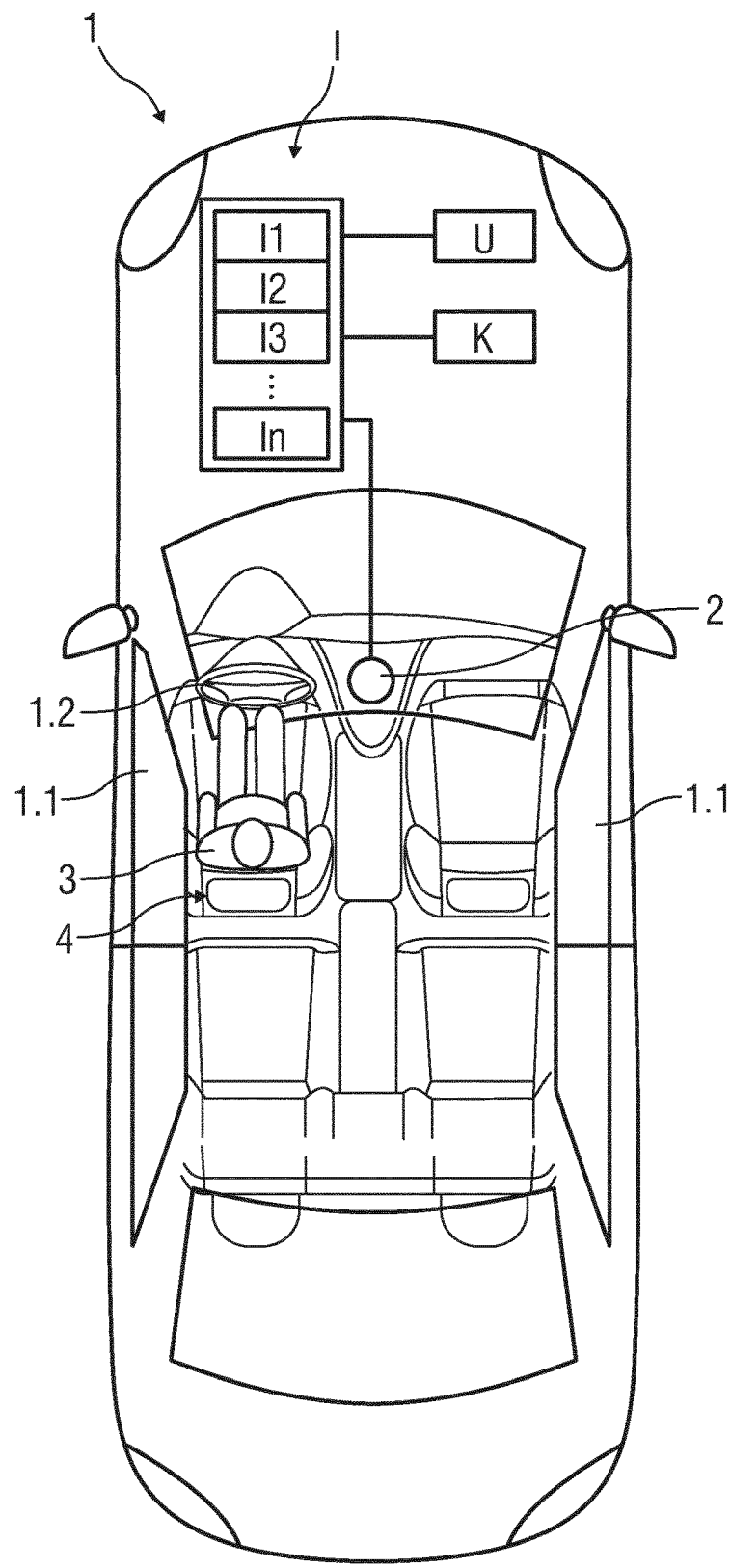

(51) Int. Cl.
*B60R 21/0136* (2006.01)
*G06V 20/59* (2022.01)
*B60R 11/04* (2006.01)
*B60R 11/00* (2006.01)

(52) U.S. Cl.
CPC .............. *G06V 20/59* (2022.01); *B60R 11/04* (2013.01); *B60R 2011/0003* (2013.01)

(56) References Cited

U.S. PATENT DOCUMENTS

| | | | |
|---|---|---|---|
| 10,304,165 B2 * | 5/2019 | Tokatyan | G06V 20/59 |
| 10,956,759 B1 * | 3/2021 | Pertsel | B60R 21/01552 |
| 11,124,143 B1 * | 9/2021 | Pertsel | G06V 10/50 |
| 2003/0179083 A1 | 9/2003 | Wallace et al. | |
| 2013/0054093 A1 | 2/2013 | Fürst et al. | |
| 2015/0379362 A1 | 12/2015 | Calmes et al. | |
| 2018/0272977 A1 * | 9/2018 | Szawarski | B60N 2/0244 |
| 2018/0304775 A1 * | 10/2018 | Foltin | B60N 2/14 |
| 2021/0170980 A1 * | 6/2021 | An | B60W 30/08 |
| 2021/0323444 A1 * | 10/2021 | Fields | B60N 2/39 |

FOREIGN PATENT DOCUMENTS

| | | |
|---|---|---|
| DE | 112014000934 T5 | 1/2016 |
| DE | 102015014138 A1 | 4/2016 |
| DE | 102015016761 A1 | 7/2016 |
| DE | 102016003315 A1 | 10/2016 |
| EP | 2492152 A1 | 8/2012 |
| EP | 2520472 A2 | 11/2012 |
| EP | 2706384 A1 | 3/2014 |
| EP | 2743141 A1 | 6/2014 |
| EP | 3165408 A1 | 5/2017 |
| JP | 2020144752 A * | 9/2020 ............. B60R 11/04 |

OTHER PUBLICATIONS

Written Opinion dated Apr. 12, 2019 in related/corresponding International Application No. PCT/EP2018/084545.

* cited by examiner

METHOD FOR OPERATING AN OCCUPANT PROTECTION DEVICE

BACKGROUND AND SUMMARY OF THE INVENTION

Exemplary embodiments of the invention relate to a method for operating an occupant protection device of a vehicle having at least one occupant protection means allocated to an occupant, the means being positioned from its starting position into its active position upon meeting a trigger condition. Furthermore, exemplary embodiments of the invention relate to a device for carrying out the method and a vehicle having such a device.

DE 11 2014 000 934 T5 discloses an imaging device or several imaging devices in an automobile, which monitors or monitor the occupants and support numerous functions in the fields of safety, comfort, driver assistance and occupant state. Here, the imaging device comprises illumination in near-infrared. The imaging device is formed in such a way that it measures vital values of the occupants using contactless imaging photoplethysmography.

Moreover, DE 10 2015 016 761 A1 describes a method for automatically emitting a warning message in a vehicle with a passenger seat and a passenger airbag, wherein a switch position of a key switch arranged in the vehicle for activating and deactivating the passenger airbag is recognized. An image detection unit detects whether the passenger seat is occupied, wherein the switch position of the key switch is compared to a seat occupation when detecting the seat is occupied by a child seat or a vehicle occupant. With a switch position not corresponding to the detected seat occupation, an acoustic warning message and an optical warning message and a handling recommendation are emitted.

Furthermore, DE 10 2016 003 315 A1 discloses a method for detecting a seat occupation of a vehicle seat arranged at least in the front region of a vehicle using an image detection unit. A detection region of the image detection unit is formed in such a way that it is determined, using the detected image data, what is occupying the respective vehicle seat. In the event of a detected occupant on the respective vehicle seat, a body contour, a body position in relation to the respective vehicle seat and a body posture of the occupant is determined.

Exemplary embodiments of the invention are directed to an improved method for operating an occupant protection device of a vehicle having at least one occupant protection means, and to a device for carrying out the method and a vehicle having such a device.

A method for operating an occupant protection device of a vehicle having at least one occupant protection means allocated to an occupant provides that the at least one occupant protection means is positioned from its starting position into an active position upon meeting a trigger condition. According to the invention, the at least one occupant protection means is controlled and triggered in the event of a detected collision imminent to the vehicle or in the event of a detected actual collision of the vehicle, additionally depending on image data, detected using the at least one interior camera, of an interior of the vehicle or using image data, detected through the vehicle window, of vehicle surroundings. Alternatively, the control and triggering of the at least one occupant protection means are suppressed depending on the detected image data of the interior camera.

"Occupant protection means" means, for example, airbags or seatbelts. However, the term shall also be understood in such a way that partner protection systems such as pedestrian protection systems are also included.

By using the method, a risk of injury to the occupant to whom at least one occupant protection means is allocated can be at least substantially reduced, since an exactness of the control and triggering of the at least one occupant protection means can be increased.

The collision of the vehicle can be visually detected using the detected image data, whereby the exactness of the triggering of the at least one occupant protection means in relation to certain collision scenarios can be correspondingly adjusted.

Moreover, the at least one occupant protection means is not controlled and triggered when it is determined using the detected image data that the occupant is outside the active region of the at least one occupant protection means or is positioned in relation to the at least one occupant protection means in such a way that the occupant is injured by the at least one occupant protection means as a result of positioning the occupant protection means into its active position.

In a development of the method, depending on the detected image data, a trigger point in time of the at least one occupant protection means is predetermined, such that a protective effect of the at least one occupant protection means is optimized for the occupant. If the occupant moves, for example during the course of the collision of the vehicle, then a further movement course of the occupant is predicted using the image data, such that the at least one occupant protection means is triggered at a point in time and is positioned into its active position when its protective position is optimal in relation to the occupant.

In one embodiment, at least one radar-based signal and/or one Lidar-based signal is or are made plausible using the detected image data before a collision occurs. Thus it is possible to determine whether a collision is actually imminent for the vehicle. In addition, the image data of the at least one interior camera is evaluated in relation to surroundings outside the vehicle.

A further embodiment provides that a change of an interior of the vehicle is determined using the detected image data. In particular, an intrusion into the interior, for example caused by a collision object in the event of a side collision of the vehicle, is detected. In such a case, an occupant protection means can be controlled and triggered such that the occupant is moved away from a collision side of the vehicle by positioning the at least one occupant protection means into its active position.

In a further possible embodiment, a movement of the occupant during the collision is detected using the detected image data, such that a movement course of the occupant can be predicted. This predicted movement course here constitutes the basis for controlling and triggering as well as for predetermining the trigger point in time of the at least one occupant protection means.

Alternatively or additionally, the occupant is automatically positioned in relation to the at least one occupant protection means in order to optimize the protective effect of the at least one occupant protection means. The automatic positioning is suitable, in particular, for use in a vehicle which can be moved in an autonomous driving operation, since the occupant can change their seating position and is thus not positioned optimally in relation to the at least one occupant protection means.

Furthermore, in one possible embodiment, the detected image data is merged with detected signals of at least one surroundings sensor, such that a trigger decision for the at least one occupant protection means can be optimized. In particular, the image data and the signals are merged in order to determine a double impact of the vehicle and to optimize a protective effect for the occupant.

In a further possible embodiment of the method, the detected image data is merged with data of an occupant position recognition device. Thus, it is possible to predict a trajectory of the occupant, i.e., the movement course in relation to the occupant, to make plausible and/or to create a more exact prediction.

Moreover, exemplary embodiments of the invention relate to an occupant protection device of a vehicle having at least one occupant protection means allocated to an occupant, the means being able to be positioned from its starting position into its active position upon meeting a trigger condition. According to the invention, the occupant protection device has at least one interior camera for detecting an interior of the vehicle or vehicle surroundings visible through the vehicle window. Here, the at least one occupant protection means can be controlled and can be triggered additionally depending on image data, detected using the at least one interior camera, of the interior of the vehicle or using image data, detected through the vehicle window, of vehicle surroundings in the event of a detected collision imminent for the vehicle or in the event of a detected actual collision of the vehicle. Alternatively, the control and triggering of the at least one occupant protection means can be suppressed depending on the detected image data of the interior camera.

Furthermore, the invention relates to a vehicle having such an occupant protection device.

Exemplary embodiments of the invention are explained in more detail below in connection with the drawing.

BRIEF DESCRIPTION OF THE DRAWING FIGURE

Here is shown:

FIG. 1, schematically, a partially transparent top view of a vehicle having an occupant protection device.

DETAILED DESCRIPTION

FIG. 1 illustrates a partially transparent top view of a vehicle 1 having an occupant protection device I, which comprises a number of occupant protection means I1 to In, is depicted.

An interior camera 2 is arranged in the vehicle 1, the camera continuously detecting image data at least in the driving operation of the vehicle 1. Here, the interior camera 2 is arranged in the vehicle 1 in such a way that an occupant 3, in particular a vehicle user, is in the detection region of the interior camera 2.

In addition, image data relating to lateral vehicle surroundings is detected using the interior camera 2. To do so, the detection region of the interior camera 2 extends out of lateral, in particular front lateral, vehicle windows 1.1.

Furthermore, the vehicle 1 has a surroundings sensor system U, which comprises a number of surroundings sensors, using which signals relating to the surroundings of the vehicle 1 and objects located in them are continuously detected.

Here, the surroundings sensors are formed as radar-based and/or Lidar-based surroundings sensors, for example. In addition, the vehicle 1 can have at least one exterior camera as a component of the surroundings sensor system U.

Moreover, the vehicle 1 comprises a collision sensor system K, which has sound-based, pressure-based, acceleration-based and/or other suitable sensors.

When an object, for example a further vehicle approaching the vehicle 1, is detected, it can be determined using detected signals of the surroundings sensor system U that a collision with the further vehicle is imminent for the vehicle 1.

In addition, the detected signals are evaluated and processed, wherein a relative speed between the two vehicles 1, for example, and a reduced spacing are determined.

The collision between the two vehicles 1 or between the vehicle 1 and another collision object is determined using detected signals of the collision sensor system K of the vehicle 1. Here, an impact on the vehicle 1 is detected, for example using detected signals of a pressure sensor.

As described above, the occupant protection device I comprises a number of occupant protection means I1 to In arranged in the vehicle 1, wherein the occupant protection means I1 to In can be a driver airbag, a passenger airbag, a seatbelt tensioner, a seat bubble arranged in the vehicle seat 4, in particular in a side plate, that can be supplied with a gas, and/or a different airbag, for example a so-called window bag.

The respective occupant protection means I1 to In is positioned from its starting position into an active position upon meeting a corresponding trigger condition, in order to at least substantially reduce the risk of injury to the occupant 3, to whom the occupant protection means I1 to In is allocated.

For optimally controlling and triggering as well as for predetermining a trigger point in time of the respective occupant protection means I1 to In, it is provided that the detected image data of the interior camera 2 of the vehicle 1 is to be taken into consideration, in addition to the detected signals of the surroundings sensor system U and the collision sensor system K. For example, an intrusion into an interior of the vehicle 1, e.g., a collision object, can be recognized using the detected image data. If the collision is a lateral collision of the vehicle 1, an optimal trigger point in time for positioning the suitable occupant protection means I1 to In, for example a lateral airbag and/or a window bag, can be determined by recognizing the imminent lateral collision through the vehicle window or at least upon recognizing an intrusion.

In addition, the seat bubble arranged in the side plate of the vehicle seat 4 can be controlled and supplied, such that the occupant 2 thus obtains an impulse and is moved away from a collision side of the vehicle 1, (PRE-SAFE impulse side). The seat bubble can also be a component of a so-called driving dynamic vehicle seat 4.

Moreover, the detected image data can be merged with the detected signals of the surrounding sensor system U, such that the collision incident is detected in a detailed manner and a control and triggering of the corresponding occupant protection means I1 to In are adjusted.

Thus, it is possible, for example, to use the image data as additional information, in order to adjust ignition times of the air bag, for example, in relation to the collision and to still influence them, where necessary, during the intrusion.

In other circumstances, the detected image data can serve for the control and triggering of an occupant protection means I1 to In to be suppressed, for example because of a position of the occupant 3 relative to the occupant protection means I1 to In.

Moreover, the detected image data of the interior camera 2 can be used to make plausible a present radar-based and/or lidar-based signal of the surroundings sensor system U before a collision occurs, e.g., via a pattern recognition. Thus, it can be determined whether the collision with a potential collision object actually occurs.

To do so, it is particularly possible that, in the event of a lateral collision imminent to the vehicle 1 using the detected signals of the surroundings sensor system U and using the detected image data of the interior camera 2, the seat bubble and/or a different suitable device in the vehicle seat 4 are to be controlled and positioned in such a way that the occupant 3 obtains an impulse and is moved away from the collision side.

A present, for example pressure-based and/or acceleration-based sensor signal, in particular of the collision sensor system K, can be extended with historical image data of the interior camera 2 during the collision of the vehicle 1, for example in order to verify the collision and to determine or to predict a collision severity, for example.

In addition, a movement of the occupant 3 can be determined using the detected image data, such that the control, triggering and the trigger point in time of the corresponding occupant protection means I1 to In can be adjusted in relation to a current position of the occupant 3.

Alternatively, the triggering of the occupant protection means I1 to In can be suppressed, since the occupant 3 is not in an optimal position relative to the occupant protection means I1 to In.

If the vehicle 1 can be moved in the autonomous driving operation, wherein the occupant 3, in particular the driver of the vehicle 1 completely surrenders their driving tasks to the vehicle 1, the occupant 3 can change their seat position and/or a steering wheel 1.2 is retracted or folded away in such a way that the occupant 3 is not positioned optimally in relation to the occupant protection means I1 to In.

A current position of the occupant 3 can be determined using the detected image data, such that the occupant 3 is automatically positioned on their vehicle seat 4 in relation to the occupant protection means I1 to In, such that a maximum protective effect of the occupant protection means I1 to In can be obtained for the occupant 3.

Alternatively or additionally, the steering wheel 1.2 can be positioned in relation to the occupant 3 so the protective effect can be optimized for the occupant 3.

It is also conceivable to merge data of an occupant position recognition device, which comprises a so-called OLC mat, for example, and/or a different suitable occupant positioning system, with the detected image data, such that a prediction about a trajectory, in particular a movement course of the occupant 3, is generated and/or determined more exactly, i.e., sharpened.

Furthermore, it can be provided that the detected signals of the surroundings sensor system U are extended by the detected image data of the interior camera 2, in order to relevantly optimize the one or more occupant protection means I1 to In corresponding to a trigger decision. To do so, a double impact on the vehicle 1 represents an application scenario.

In other words: in the future, there will increasingly be vehicles with interior cameras. The aim is to use the image evaluation, in order to be able to recognize intrusions, for example. Furthermore, the accident incident could be detected in more detail by merging with the data from the surroundings sensors and the protective systems are correspondingly adjusted. The crash sensing in many crash scenarios can be increased by the invention of the visual crash recognition from the image data of an interior camera. This relates to the lateral crash in particular. The visual crash recognition via the at least one interior camera increases the exactness of the triggering in certain scenarios. Furthermore, this additional information could be used to adjust ignition times, for example, of the withholding systems to the crash or to still influence them during the intrusion.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating an occupant protection device of a vehicle having at least one occupant protection means allocated to an occupant, which is positioned from its starting position into an active position upon meeting a trigger condition, the method comprising:
    detecting whether there is an imminent collision for the vehicle or whether there is an actual collision for the vehicle;
    detecting, by at least one interior camera located inside of the vehicle, image data of an interior of the vehicle and image data of lateral vehicle surroundings obtained through a vehicle window;
    controlling, responsive to the detection of the imminent collision or of the actual collision, the at least one occupant protection means, wherein, based on the detected image data of the interior of the vehicle and of the lateral vehicle surroundings, the controlling includes triggering the occupant protection means or, based on the detected image data of the interior of the vehicle and of the lateral vehicle surroundings, suppressing the triggering of the occupant protection means;
    predetermining, based on the detected image data, a trigger point in time for the triggering of the at least one occupant protection means; and
    making plausible, prior to the actual collision for the vehicle and using the detected image data, at least one radar-based or one Lidar-based signal, or one calculated surroundings or situation model.

2. The method of claim 1, further comprising:
    determining, based on the detected image data, a change of the interior of the vehicle.

3. The method of claim 1, further comprising:
    detecting, using the detected image data, a movement of the occupant during the collision.

4. The method of claim 3, further comprising:
    predicting, based on the detected image data of the movement of the occupant during the collision, a further course of movement of the occupant,
    wherein the predetermined trigger point in time accounts for the predicted further course of movement of the occupant.

5. The method of claim 3, wherein the detected image data includes an intrusion into the interior of the vehicle during the actual collision and, responsive thereto, the occupant protection means moves the occupant away from a side of the vehicle where the intrusion occurs.

6. The method of claim 1, wherein the occupant is automatically positioned in relation to the at least one occupant protection means.

7. The method of claim 1, further comprising:
merging the detected image data with detected signals at least of a surroundings sensor or with a surroundings or situation model.

8. The method of claim 1, further comprising:
merging the detected image data with data of an occupant position detection device; and
predicting a trajectory of the occupant based on the merged detecting image data and the data of the occupant position detection device.

9. The method of claim 1, further comprising:
predicting, based on the detected image data of the movement of the occupant during the collision, a further course of movement of the occupant,
wherein the predetermined trigger point in time accounts for the predicted further course of movement of the occupant.

10. The method of claim 1, wherein the detected image data includes an intrusion into the interior of the vehicle during the actual collision and, responsive thereto, the occupant protection means moves the occupant away from a side of the vehicle where the intrusion occurs.

11. An occupant protection device of a vehicle, the occupant protection device comprising:
at least one occupant protection means allocated to an occupant of the vehicle, wherein the at least one occupant protection means is configured to move from a starting position into an active position responsive to occurrence of a trigger condition;
at least one interior camera arranged in the interior of the vehicle and configured to detect the interior of the vehicle and lateral vehicle surroundings that are visible through a window of the vehicle,
wherein the at least one occupant protection means is configured to be controlled responsive to detection of an imminent collision or of an actual collision of the vehicle,
wherein, based on the detected image data of the interior of the vehicle and of the lateral vehicle surroundings, the controlling includes triggering the at least one occupant protection means or, based on the detected image data of the interior of the vehicle and of the lateral vehicle surroundings, suppressing the triggering of the at least one occupant protection means.

12. The occupant detection device of claim 11, wherein, based on the detected image data of the movement of the occupant during the collision, a further course of movement of the occupant is predicted, and wherein the predetermined trigger point in time accounts for the predicted further course of movement of the occupant.

13. A vehicle, comprising:
a vehicle interior;
a vehicle window; and
an occupant protection device, comprising
at least one occupant protection means allocated to an occupant of the vehicle, wherein the at least one occupant protection means is configured to move from a starting position into an active position responsive to occurrence of a trigger condition;
at least one interior camera arranged in the interior of the vehicle and configured to detect the interior of the vehicle and lateral vehicle surroundings that are visible through a window of the vehicle,
wherein the at least one occupant protection means is configured to be controlled responsive to detection of an imminent collision or of an actual collision of the vehicle,
wherein, based on the detected image data of the interior of the vehicle and of the lateral vehicle surroundings, the controlling includes triggering the at least one occupant protection means or, based on the detected image data of the interior of the vehicle and of the lateral vehicle surroundings, suppressing the triggering of the at least one occupant protection means.

14. The occupant detection device of claim 11, wherein the detected image data includes an intrusion into the interior of the vehicle during the actual collision and, responsive thereto, the occupant protection means moves the occupant away from a side of the vehicle where the intrusion occurs.

15. The vehicle of claim 13, wherein, based on the detected image data of the movement of the occupant during the collision, a further course of movement of the occupant is predicted, and wherein the predetermined trigger point in time accounts for the predicted further course of movement of the occupant.

16. The vehicle of claim 13, wherein the detected image data includes an intrusion into the interior of the vehicle during the actual collision and, responsive thereto, the occupant protection means moves the occupant away from a side of the vehicle where the intrusion occurs.

* * * * *